Dec. 30, 1947. P. VAN SITTERT 2,433,719
VALVE CONTROL MECHANISM FOR PRESSURE FLUID MOTORS
Filed March 9, 1944 3 Sheets-Sheet 1
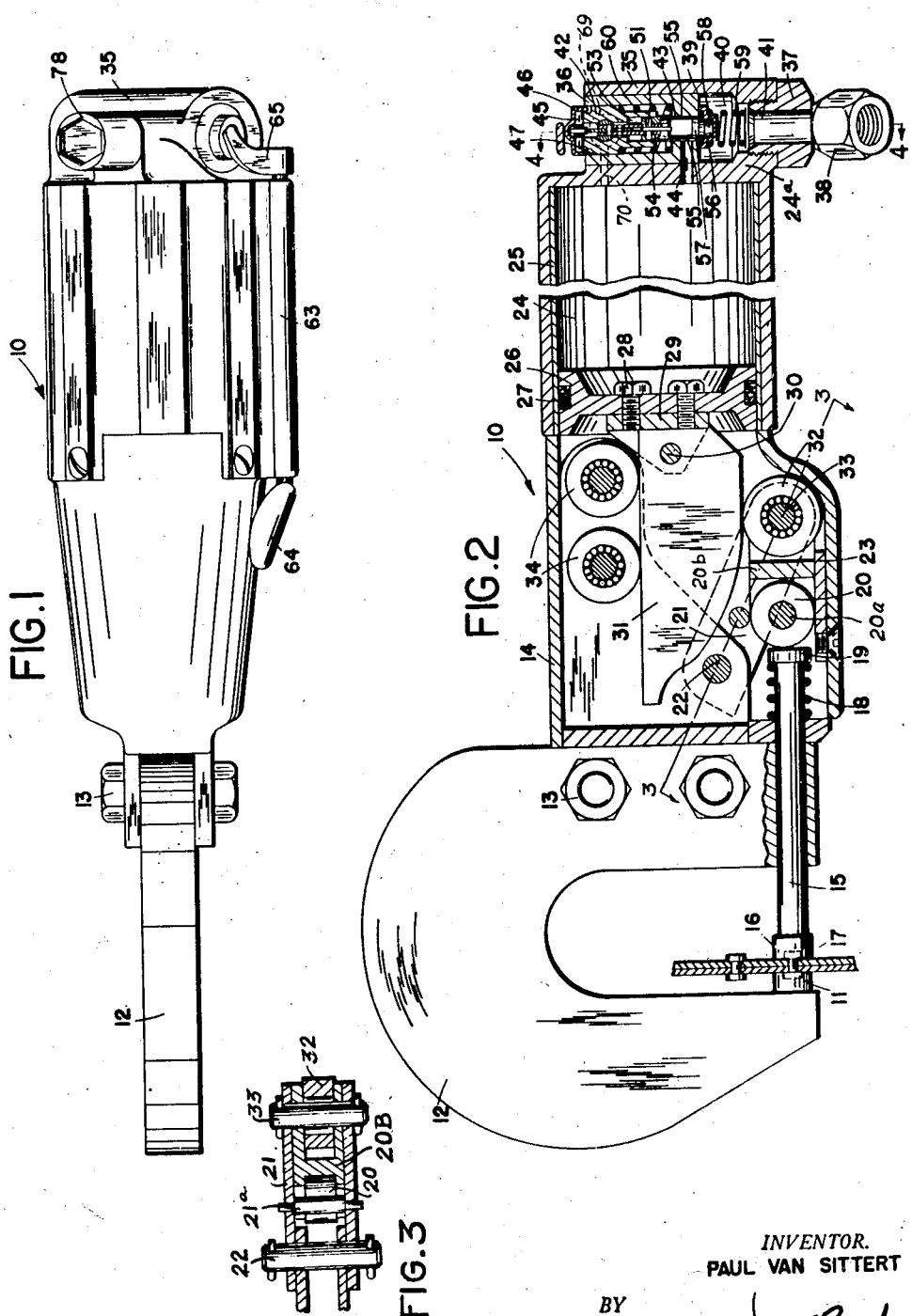
INVENTOR.
PAUL VAN SITTERT
BY
[signature]
ATTORNEY Dec. 30, 1947.  P. VAN SITTERT  2,433,719
VALVE CONTROL MECHANISM FOR PRESSURE FLUID MOTORS
Filed March 9, 1944   3 Sheets-Sheet 2

*INVENTOR.*
PAUL VAN SITTERT

BY

*ATTORNEY*

Dec. 30, 1947. P. VAN SITTERT 2,433,719
VALVE CONTROL MECHANISM FOR PRESSURE FLUID MOTORS
Filed March 9, 1944 3 Sheets-Sheet 3

INVENTOR.
PAUL VAN SITTERT

BY

ATTORNEY

Patented Dec. 30, 1947

2,433,719

UNITED STATES PATENT OFFICE 2,433,719

VALVE CONTROL MECHANISM FOR PRESSURE FLUID MOTORS

Paul Van Sittert, Shaker Heights, Ohio, assignor, by mesne assignments, to Reed Roller Bit Company, Houston, Tex., a corporation of Texas Application March 9, 1944, Serial No. 525,627

9 Claims. (Cl. 121—38)

The present invention relates to improvements in tools of the type operated by compressed air, and more particularly to an improved valve control mechanism for such tools.

An important object of the invention is to provide improved means associated with the throttle valve of a pneumatically operated tool for automatically shutting off the supply of fluid to the tool as soon as the pressure of the fluid within the operating cylinder reaches a predetermined maximum.

Another object of the invention is to embody a flexible link controlling mechanism as a part of the throttle valve of a pneumatically operated tool, such link mechanism adapted to be collapsed by a plunger slidably actuated when the pressure of the fluid within the cylinder of the tool reaches a predetermined maximum.

A further object of the invention is the provision of a simple, readily adjustable control mechanism for accomplishing the purpose of the invention.

Other objects and advantages more or less ancillary to the foregoing reside in the specific construction and agroupment of the elements peculiar to this structure, as will become apparent from a more complete examination of this specification.

In the drawing which illustrates the invention:

Fig. 1 is a top plan view of a compressed air rivet squeezer embodying the features of the present invention.

Figure 2 is a longitudinal sectional view thereof with parts in elevation.

Fig. 3 is a fragmentary sectional view approximately on the line 3—3 of Fig. 2.

Figure 5:
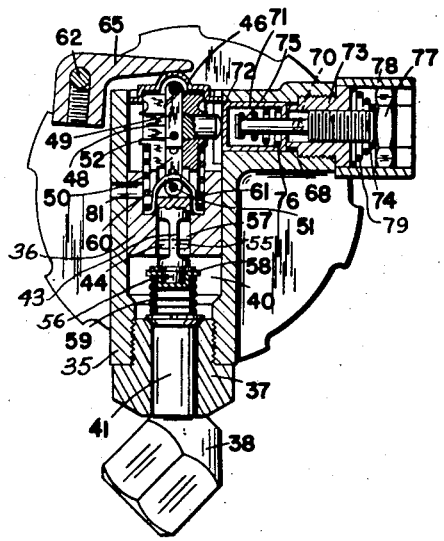
Fig. 5 is a view similar to Fig. 4 and illustrating the valve in its fully open position.

Referring to the drawings for a more detailed description thereof, one embodiment of the invention has been illustrated in use with a rivet squeezer, generally designated by the reference numeral 10 which comprises an anvil 11 carried by an anvil arm 12 which is rigidly connected by means of bolts or the like 13 with the barrel or body 14 of the tool. A plunger 15 having an enlarged head 16 is operatively supported in the arm 12, the enlarged head 16 being adapted to engage and upset a rivet 17 positioned against the anvil 11. A coil spring 18 tends to retract the plunger 15 and maintain its rear end 19 in engagement with a roller 20 carried by a pin 20a fixed in the front end of a member 20b, the rear end of which member is pivotally connected by a pin 33 with the free end of an arm 21 free to swing about a pivot 22 carried by the body of the tool. The arm 21 comprises a pair of plates or links held in spaced relation by a spacer pin 21a. The roller 20 presses against the rear end of the plunger 15, and rolls upon a hardened plate 23. The two elements 20b and 21 constitute in effect a toggle joint.

Attached to and forming a part of the body 14 of the tool is a cylinder 24 provided with a liner 25 in which slides a piston 26 provided with a suitable packing means 27. To the forward side of the piston 26, there is fastened by means of screws or the like 28 a bracket 29 with a pair of projections in which is mounted a pin 30 for attaching a forwardly extending operating member or block 31 to the bracket 29 and, in turn, the piston 26. The bottom surface of the block 31 is cam-shaped for engagement with an anti-friction roller 32 carried upon the pivotal connection 33 between the toggle elements 20b and 21. The straight upper side of the plate 31 has bearing engagement with a pair of rollers 34 carried in the body of the tool. As is to be understood, as the piston 26 moves forward from its rearmost position by the action of compressed air fed into the cylinder 24 to the right of the piston 26, the roller 32 will be cammed downwardly, causing the roller 20 to travel in a forward direction and thereby move the plunger 15 into pressing engagement with the rivet. When the rivet has been headed and the pressure behind the piston 26 has been relieved, the piston and plate 31 are moved rearwardly by suitable means, not shown, after which the tool is ready to repeat the cycle. The general construction of the tool as thus far described is well known in the art, and per se forms no part of the present invention.

Formed integral with the closed end or head 24a of the cylinder 24, there is a substantially cylindrical boss 35 in which is fixedly mounted a sleeve 36. The lower end of boss 35 carries a plug 37 from which extends a connection 38 for coupling the tool with a source of fluid supply. The sleeve 36 has a closed end 39 formed with a central bore 57 and which is spaced from the plug 37 to provide a chamber 40 which has communication with the inlet bore 41 of the plug coupling 37.

The sleeve 36 slidably supports therein a plunger 42 operatively connected to a valve 43 for controlling the ingress and egress of compressed air to and from the cylinder 24 through the registering openings 44 in the end of the cylinder 24 and the lower end 39 of the sleeve 36. The manner in which the valve 43 is connected to the plunger 42 will be hereinafter more fully described.

Extending transversely across the top of the plunger 42, there is a pin 45 which is held in place by means of a cap 46 frictionally held on the plunger 42 by being pressed into the annular grooves 47 thereof. The plunger 42 is formed with a vertically extending central opening and carries therein a toggle or flexible link mechanism generally designated as 48, said mechanism including a link 49 mounted on the pin 45 and a pair of links 50 pivotally connected by a cross pin 51 carried by the valve 43 and extending transversely thereof. The other end of the links 50 are pivotally connected to the link 49 as indicated at 52. It is understood that the lower end of link 49 is pivotally held between the pair of links 50 and that the pair of links 50 are directly connected to upper end of the valve 43.

Formed in the lower end of the plunger 42 is a bore 53 which communicates with the central opening of said plunger and in which is received the upper end of the valve 43. Of course, this end of the valve 43 is notched to receive the lower end of the link members 50 which are pivotally held therein by means of the cross pin 51. Valve 43 includes the head piece 54 from which depends a control web portion 55 having integrally formed thereon a tapered head 56. The web 55 extends through an opening 57 formed in the bottom wall 39 of the sleeve 36, and the tapered head 56 carries a cap 58 which normally bears against the lower face of the bottom wall of the sleeve 36 and in cooperation with the tapered head 56, closes the inlet port or the lower end of the opening 57 when the parts are in the position illustrated in Figs. 2 and 4 of the drawings. A coil spring 59 is interposed between the cap 58 and the bottom of the bore 40 for normally maintaining said cap in its closed position. The headpiece 54 is adapted to open or close the exhaust port or upper end of the opening or bore 57 depending upon the position of the valve member 43 of which it is a part. A second coil spring 60 surrounds the plunger 42 and has one end in engagement with the plunger while its other end is supported by means of a substantially U-shaped clip 61 mounted between the link members 50 and disposed over the cross pin 51. Spring 60 functions to urge the plunger 42 and its associated mechanism upwardly and, therefore, cooperates with the spring 59 to normally maintain the valve in position to close the inlet port and open the exhaust port.

For manually operating the valve, there is provided a rod 62 extending longitudinally of the tool within a casing 63 suitably secured to the body of the tool. One end of the rod carries a finger piece 64 while the other end has attached thereto a lever 65 which bears against the valve cap 46. As is understood, when the operator of a tool depresses the finger piece 64, the rod 62 is rotated, causing the lever 65 to bear down against the cap 46 which will move the plunger 42, links 49 and 50, and valve 43 downwardly, thereby closing the exhaust passage or port and unseating the cap 58 of the valve 43 permitting compressed air to enter the cylinder 24 from the bore 40 through the openings 44. This position of the parts is illustrated in Fig. 5 of the drawing and with the admission of compressed air into the cylinder 24, the piston 26 will be moved forwardly to upset or head the rivet 17 in the manner previously described.

In accordance with the present invention, a means has been provided for automatically shutting off the supply of compressed air to the cylinder 24 and opening the cylinder to atmosphere when the pressure within the cylinder 24 has reached a predetermined maximum. This means includes a button 66 carried by the plunger 42 and mounted for movement transversely thereof. The button 66 is formed with a U-shaped end 67 which straddles the link members 49 and 50 permitting a portion of said button to be in contact with said link members at all times. As will hereinafter appear, the button 66 is actuated to move the flexible link connection between the plunger 42 and the valve member 43 laterally and thus collapse the links 49 and 50 which form a flexible column to the position shown in Fig. 6 which permits the valve 43 to move into the position shown in Fig. 5 and close the inlet port and open the exhaust port by the action of the coil spring 59.

Extending laterally from the upper end of valve boss 35, there is a substantially cylindrical projection 68 having a bore 69 extending therethrough and communicating with the boss 35. The bore 69 is also in communication with the interior of the cylinder 24 through a passage 70. A hollow plunger 71 is mounted in the bore 69, one end 72 of which plunger has bearing engagement with the laterally movable button 66. The outer end of the projection 68 has threadedly attached thereto a hollow plug shaped member 73 in which is threaded a stem 74 whose inner end 75 is received within the hollow plunger 71. A coil spring 76 interposed between the stem end 75 and the outer wall of the plunger 71 tends to move this plunger outwardly into the position shown in Figs. 4 and 5 of the drawings. The other end of the stem 74 is formed with a head 77 which is concealed by a knurled sleeve 78. A coil spring 79 surrounds the stem 74 and is interposed between the plug 73 and the head 77. The inner end of the spring 79 is fixed to the sleeve 78. The operator may grasp the sleeve 78 and pull it out sufficiently to clear the plug 73 after which the head 77 is rotated to move the pin 74 for the purpose of adjusting the tension of the spring 76, after which he may let the spring 79 return the sleeve into locking engagement with the plug 73. The adjustment is thereby maintained against accidental movement, and said adjustment is effected when it is desired to control the pressure at which the hollow plunger 71 is to be capable of slidable movement for actuating the button 66. In other words, the froce of the spring 76 must be overcome by the pressure built up in the cylinder 24 before the plunger 71 will operate.

Figure 6:
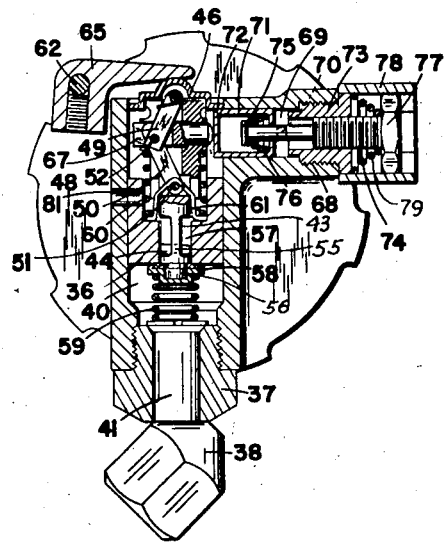
Fig. 6 is a view similar to Fig. 4 and illustrating the valve mechanism being closed by the automatic shut-off means.
Figure 4:
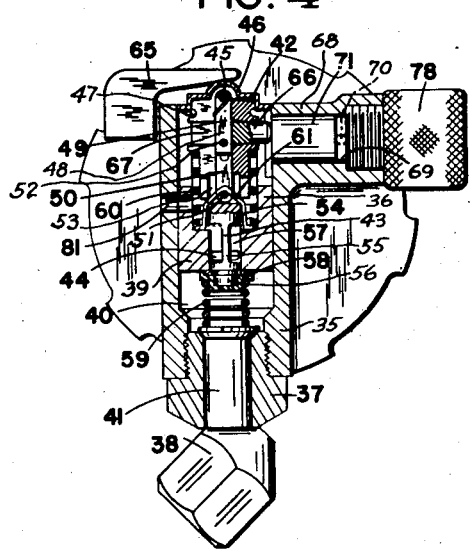
Fig. 4 is a vertical sectional view through the valve mechanism and taken substantially on line 4—4 of Fig. 2.

A further feature of the present invention resides in the manner in which the inlet and exhaust ports are controlled by the valve 43. Referring to Figs. 4, 5, and 6, it will be noted that the fixed sleeve 36 is formed with a passage 57 which communicates with the bore 40 and in which the head 54 of the valve 43 is movable. Passage 57 communicates with the cylinder 24 through the inlet openings 44, and said passage also communicates with exhaust ports 81 formed in the sleeve 36 and boss 35. With the valve 43 in the closed position illustrated in Figs. 4 and 6, air from the cylinder is exhausted through the opening 44, passage 57, and ports 81 since the valve head 54 is then raised above the passage 57 opening the exhaust port and permitting free exhaust of the air. However, when the valve 43 is moved downwardly in the manner previously described, the head 54 moves into the passage 57, thereby closing the exhaust port or passage by shutting off communication between said passage 57 and the exhaust ports 81 and at the same time opening the inlet port permitting the compressed air to flow through the inlet coupling 38 into the bore 40, passage 57, and passages 44 to the cylinder 24. Thus, it will be seen that the valve 43 is in reality formed with a valve head on each end, which when in one position, opens the inlet port and closes the exhaust port, and in the other position will open the exhaust port and close the inlet port.

In the operation of the tool, the normal position of the control parts is illustrated in Fig. 4 where the inlet port is closed by the valve cap 58 engaging the lower wall of the sleeve 36 and where the exhaust port is open so that the passages 44 and 57 from the cylinder 24 are open to atmosphere. When the operator of the tool is ready to upset a rivet, he causes the cap 46 to be depressed from the position shown in Fig. 4 to that of Fig. 5. This depression of the cap 46 will move the plunger 42 and the associated link and valve mechanism downwardly against the action of the springs 59 and 60, and as the valve head moves into the passage 57, the exhaust port is closed and the inlet passage open since the valve cap 58 is unseated. Air under pressure then flows from the supply into the cylinder 24 via the passages 57 and 44, forcing the piston 26 to the left and operating the plunger 15 in the manner previously described. At the start of this operation, the tension of the spring 76 active on the hollow plunger 71 is calculated to overcome the normal pressure of the compressed air admitted from the cylinder 24 into the plunger 71 through the passage 70, which pressure is exerted against the inner face of the closed end of the plunger. As work progresses, the working stroke of the plunger 15 is met with gradually increasing resistance resulting from the increased area of the rivet 17 subjected to compression, consequently causing the pressure in the cylinder 24 to build up to a predetermined maximum necessary for effecting proper upsetting of the rivet. When the pressure in cylinder 24 has reached its maximum, its action on the hollow plunger 71 will overcome the effect of the spring 76, causing said plunger to slide inwardly and move the button 66 laterally. Since the button 66 is in constant engagement with the flexible connection between the members 42, 43 comprising the links 49 and 50 substantially at their point of pivotal connection, said links will be caused to collapse to the position shown in Fig. 6 which collapsing will seat the valve cap 58, thereby shutting off the flow of air to the cylinder 24. As the valve 43 is moved upwardly by the collapse of the links 49 and 50, the valve head 54 will move out of the passage 57, thereby allowing the air in the cylinder 24 to be exhausted through the opening 44, passage 57, and exhaust ports 81 preparatory to the return stroke of the piston 26.

After the rivet is upset and the control parts have assumed the position of Fig. 6, it is immaterial how long the operator may keep the plunger 42 depressed. The discharge of air from the cylinder 24 will relieve the pressure on the hollow plunger 71, and said plunger will return to its normal position under the action of the spring 76. The button 66, however, will not return to its normal position until the plunger 42 is returned to its initial position which is effected by the spring 60 as soon as pressure is released on the cap 46.

Figure 8:
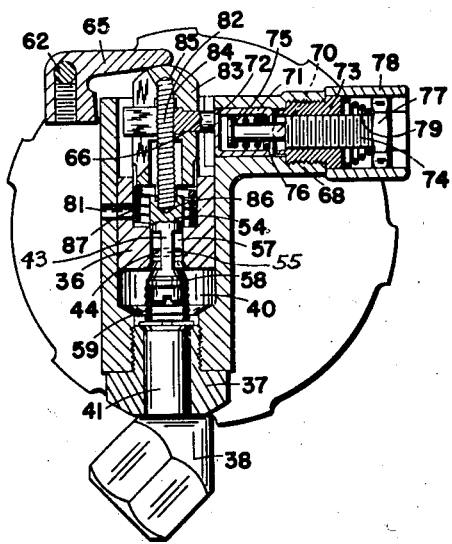
Fig. 8 is a view similar to Fig. 7 of the valve in its fully open position.
Figure 9:
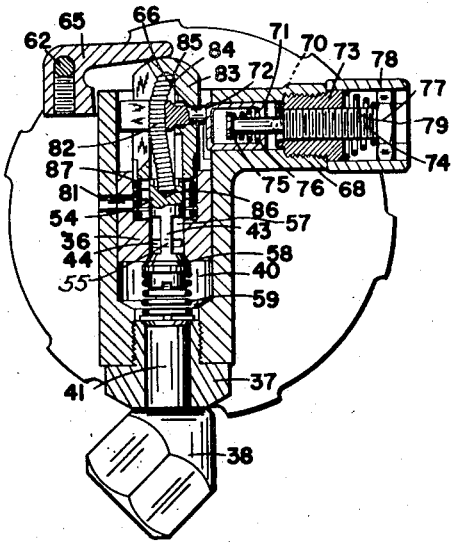
Fig. 9 is a view similar to Fig. 7 with the valve being closed by the automatic shut-off mechanism.
Figure 7:
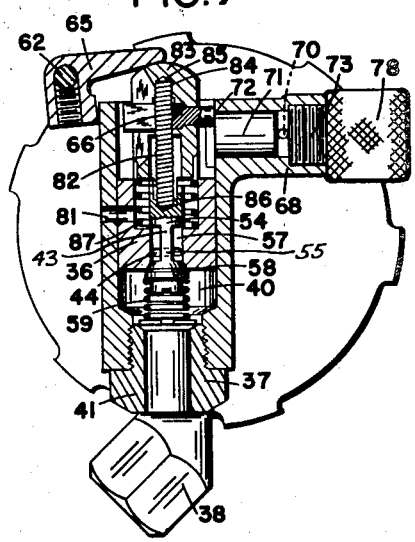
Fig. 7 is a vertical sectional view of a modified form of the invention.

In the modified form of the invention illustrated in Figs. 7 to 9, inclusive, the primary difference resides in the construction of the collapsing means for the valve. It will be observed that a coil spring 82 has been substituted for the collapsible link members 49 and 50. Also, the construction of the slidable plunger 83 is slightly different from the plunger 42 illustrated in the preferred form in that the cap 46 has been eliminated, thereby enabling the lever 65 to rest directly against the plunger for actuating the same. The plunger 83 is formed with a central bore 84, the spring 82 being disposed in said bore and suitably secured as indicated at 85 within the upper end of the plunger while the lower end of said spring is secured as indicated at 86 within the head 54 of the valve.

A coil spring 87 is interposed between the lower end of the plunger 83 and the bottom wall of the sleeve 36 for returning said plunger to normal position upon release of the actuating lever 65. In this instance, it will be noted that the U-shaped clip which supports one end of the coil spring in the preferred form has been eliminated.

The operation of the modified form is exactly the same as that of the preferred form in that movement of the spring 82 to the position illustrated in Fig. 9 of the drawing will seat the valve shutting off the flow of air to the cylinder 24 and permitting the exhaust of air from said cylinder to the atmosphere.

The spring 82 is sufficiently rigid to effect movement of the valve 43 when depressing the plunger 83. However, said spring will be readily flexed to the Fig. 9 position by means of the button 66 and hollow plunger 71, the operation of which has been fully described in connection with the preferred form.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

I claim:

1. In a fluid operated tool, the combination with an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, a valve adapted when moved to one position to open said inlet port and close said exhaust port and when moved to another position to close said inlet port and open said exhaust port, flexible column means within said plunger and operatively connected thereto and to said valve, transversely movable means for collapsing said flexible column means, and means for actuating said transversely movable means when the pressure fluid in said cylinder reaches a predetermined maximum for actuating said valve to close the inlet port and open the exhaust port.

2. In a fluid operated tool, an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, a valve, flexible column means within said plunger and operatively connected thereto and to said valve, means movable transversely of said flexible column means for collapsing said flexible column means, said valve having a head on the upper and lower ends thereof, the upper valve head being movable within said central passage as said valve is moved to open said inlet port and close said exhaust port and the lower valve head bearing against the bottom wall of said sleeve as said valve is moved to close said inlet port and open said exhaust port, and means for moving said transversely movable means when the pressure fluid in said cylinder reaches a predetermined maximum for operating said valve to close the inlet port and open the exhaust port.

3. In a fluid operated tool, an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, collapsible link mechanism mounted longitudinally within said plunger and operatively connected thereto, means movable transversely of said link mechanism for collapsing said link mechanism, a valve carried by said link mechanism and movable with said plunger to open said inlet port and close said exhaust port and to close said inlet port and open said exhaust port when in another position, and means for actuating said transversely movable means to collapse said link mechanism when the pressure fluid in said cylinder reaches a predetermined maximum thereby operating said valve to close the inlet port and open the exhaust port.

4. In a fluid operated tool, an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, said plunger having a passage formed centrally thereof, a collapsible link mechanism positioned in said passage, means extending transversely of said plunger and maintained in contact with said link mechanism, a valve carried by said link mechanism and movable with said plunger to open said inlet port and close said exhaust port in one position and to close said inlet port and open said exhaust port in another position, and means for actuating said transverse means when the pressure fluid in said cylinder reaches a predetermined maximum to collapse said link mechanism and thereby operate said valve to close the inlet port and open the exhaust port.

5. In a fluid operated tool, an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, a valve having a head on the upper and lower ends thereof, the upper valve head being movable within said central passage as said valve is moved to open said inlet port and close said exhaust port and the lower valve head bearing against the bottom wall of said sleeve as said valve is moved to close said inlet port and open said exhaust port, a flexible column member mounted longitudinally within said plunger and having one end attached to the upper valve head whereby said valve is moved downwardly with said plunger to open said inlet port and close said exhaust port, a member movable transversely of said flexible column member for collapsing said flexible column member, and means for moving said last named member when the pressure fluid in said cylinder reaches a predetermined maximum for operating said valve to close the inlet port and open the exhaust port.

6. In a fluid operated tool, an operating member, a cylinder, a piston therein operatively connected with said operating member, control means connected with said cylinder having a pressure fluid inlet port and a pressure fluid exhaust port, said control means including a cylindrical boss having a sleeve fixedly secured therein and having a central passage in its bottom wall communicating with said inlet and exhaust ports, a plunger slidable in said sleeve, a valve having a head on the upper and lower ends thereof, the upper valve head being movable within said central passage as said valve is moved to open said inlet port and close said exhaust port and the lower valve head bearing against the bottom wall of said sleeve as said valve is moved to close said inlet port and open said exhaust port, said plunger having a passage formed centrally thereof, a coil spring positioned within said passage, one end of said coil spring being fixed to said plunger and the other end of said coil spring being fixed to said upper valve head whereby movement of said plunger will operate said valve to open said inlet port and close said exhaust port, a member movable transversely of said coil spring for collapsing said coil spring, and means for moving said member to collapse said coil spring when the pressure fluid in said cylinder reaches a predetermined maximum thereby operating said valve to close the inlet port and open the exhaust port.

7. In a pressure fluid operated portable tool of the character referred to, the combination with a cylinder having a piston slidably supported therein and provided with a valve chamber, of valve means in the valve chamber for controlling the ingress and egress of fluid to and from the cylinder, a slidable member for actuating said valve means in a direction to admit fluid to the cylinder, yieldable means for continuously urging said valve means in a direction to exhaust fluid from the cylinder, flexible column means operatively connected to said valve means and said movable member for normally retaining said valve means and said movable member in predetermined spaced relation for movement as a unit to admit fluid to said cylinder, a member movable transversely of said flexible column means for flexing the same, and means effective upon the attainment of a predetermined pressure in the cylinder for moving said transversely movable member to flex said flexible column means laterally and cause it to collapse and permit relative movement between said valve means and said movable member whereby the direction of flow of fluid to the cylinder is reversed.

8. In a pressure fluid operated portable tool of the character referred to, the combination with a cylinder having a piston slidable therein and provided with a valve chamber, of means for controlling the ingress and egress of fluid to and from the cylinder, said means comprising an axially movable valve member located in the valve chamber, yieldable means for continuously urging said valve member in a direction to exhaust fluid from the cylinder, a plunger member movable towards and from said valve member, flexible column means operatively connected to said valve and said plunger members for normally retaining said valve and said plunger members in predetermined spaced relation whereby said members may be moved as a unit to admit fluid to the cylinder, a member movable transversely of said flexible column means for flexing the same, and means effective upon the attainment of a predetermined pressure in the cylinder for moving said transversely movable member to flex said flexible column means laterally of the direction of movement of said valve member to allow relative movement between said members whereby the direction of flow of fluid to the cylinder is reversed.

9. In a pressure fluid operated portable tool of the character referred to, the combination with a cylinder having a piston slidable therein and provided with a valve chamber, of means for controlling the ingress and egress of fluid to and from the cylinder, said means comprising an axially movable valve member located in the valve chamber, yieldable means for continuously urging said valve member in a direction to exhaust fluid from the cylinder, a plunger member movable towards and from said valve member, flexible column means within said plunger member and operatively connected to said valve and said plunger members for normally retaining said valve and said plunger members in predetermined spaced relation whereby said members may be moved as a unit to admit fluid to the cylinder, a member slidably carried by said plunger member for movement transversely of said flexible column means for flexing the same, and means effective upon the attainment of a predetermined pressure in the cylinder for moving said transversely movable member to flex said flexible column laterally of the direction of movement of said valve member to allow relative movement between said members whereby the direction of flow of fluid to the cylinder is reversed.

PAUL VAN SITTERT.

REFERENCES CITED

The following references are of record in the file of this patent:

UNITED STATES PATENTS

| Number | Name | Date |
|---|---|---|
| 1,156,855 | Akans | Oct. 12, 1915 |
| 1,907,538 | Hanna | May 9, 1933 |
| 2,067,064 | Platz | Jan. 5, 1937 |
| 2,137,954 | Sanford | Nov. 22, 1938 |
| 2,246,379 | Muir | June 17, 1941 |
| 2,354,841 | Shaff | Aug. 1, 1944 |